(12) United States Patent
Hinds et al.

(10) Patent No.: US 6,920,287 B1
(45) Date of Patent: Jul. 19, 2005

(54) SMART CONNECT (75) Inventors: Mark R. Hinds, Ottawa (CA);
Stephane St. Laurant, Santa Clara, CA (US)

(73) Assignee: Nortel Networks Limited, St. Laurent (CA)

( * ) Notice: Subject to any disclaimer, the term of this patent is extended or adjusted under 35 U.S.C. 154(b) by 877 days.

(21) Appl. No.: 09/630,681

(22) Filed: Aug. 1, 2000

(51) Int. Cl.$^7$ .............................................. H04B 10/08
(52) U.S. Cl. .............................. 398/9; 398/10; 398/11; 398/13; 398/16; 398/17; 398/18; 398/20; 398/30; 398/31; 398/32; 398/33; 370/241; 370/244; 370/250; 370/258; 370/259; 709/223; 709/224; 709/248
(58) Field of Search ................................ 398/9, 10, 11, 398/13, 16, 17, 18, 20, 30, 31, 32, 33, 1–5; 370/241, 244, 250, 258, 259; 709/223, 224, 248

(56) References Cited

U.S. PATENT DOCUMENTS

| | | | |
|---|---|---|---|
| 5,440,418 A | 8/1995 | Ishimura et al. ............. 359/177 |
| 5,859,716 A | 1/1999 | O'Sullivan et al. ......... 359/110 |
| 6,005,694 A | 12/1999 | Liu ............................. 359/110 |
| 6,433,903 B1 * | 8/2002 | Barry et al. .................. 398/79 |
| 6,504,630 B1 * | 1/2003 | Czarnocha et al. ........... 398/15 |
| 6,654,802 B1 * | 11/2003 | Oliva et al. ................. 709/224 |

* cited by examiner

Primary Examiner—Hanh Phan
(74) Attorney, Agent, or Firm—Jeffrey Measures; Bordan Ladner Gervais LLP (57) ABSTRACT

To automate fiber connectivity management in optical systems, a dedicated low bit-rate communications channel unique to each fiber connection in an optical system is provided. The dedicated communications channel simplifies fiber connectivity management by supporting the exchange of port identification information from one optical component to another after which processing determines if the specific connection is a desired association. The dedicated communications channel supports optical interconnection surveillance for all card-to-card optical connections within a group of related cards or within an optical network link. Automating fiber connectivity management in this manner will enhance future products by simplifying the fiber connection validation process and ensuring that any specific connection between optical components is the required association. This will be particularly useful in complex optical environments with many interconnected devices and where troubleshooting faulty connections would be time-consuming and, therefore, very costly.

19 Claims, 12 Drawing Sheets

SMART CONNECT

FIELD OF THE INVENTION

This invention relates to optical connectivity management and, more particularly, to a method and apparatus for verifying optical connections in an optical system.

BACKGROUND OF THE INVENTION

The demand for increased network capacity brought on largely by the advent of the information age has led to the introduction of high bit rate optical links employing a technology known as dense wavelength division multiplexing (DWDM). Carriers are always looking to maximize their network capacity and multiplex as many wavelength channels as possible onto a single optical fiber.

In the future, bandwidth-hungry carriers will continue to demand increased transport capabilities to handle the explosion in the volume of digital traffic. At the transport level, this will likely be accommodated through the use of DWDM with 100 or more wavelengths on a single optical fiber, and with each wavelength carrying a high bit rate channel. If a large number of such multi-wavelength fibers pass through a given network element node, the equipment at the node will be required to support such capacities.

Fiber optic network element nodes are presently configured for different networking topologies as required to achieve the cost containment, reliability and bandwidth management objectives of the specific application. Supported configurations include point-to-point terminals, survivable ring nodes, linear add/drop multiplexers (ADMs), optical hubs, regenerators and optical amplifiers. To function properly, individual pieces of equipment must be installed correctly and with correct optical interconnections between respective components. In addition, to address changing needs over time, equipment within a network element node may periodically need to be upgraded to a more advanced technology or reconfigured to support increased system capacity requirements.

Figure 1:
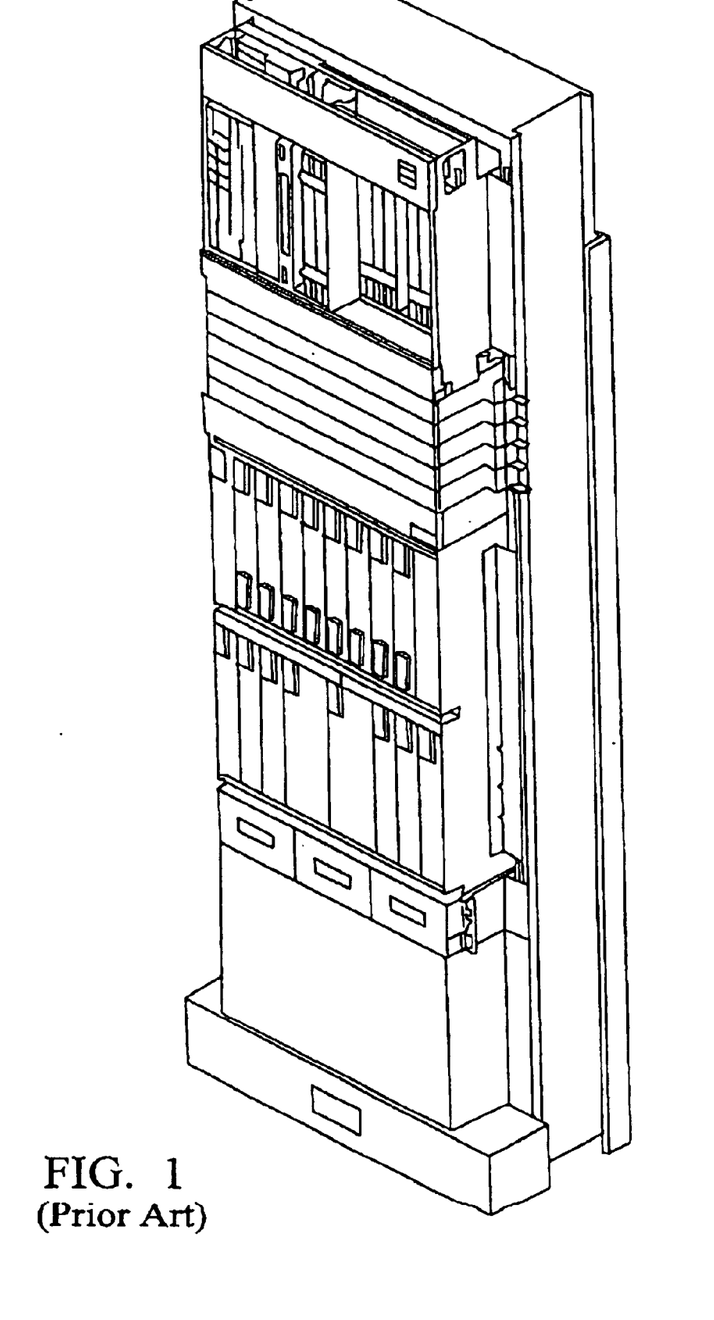
FIG. 1 illustrates the physical layout of a typical network element bay.

Network element architecture support s a variety of network topologies using a common "bay/shelf" equipment layout as shown in FIG. 1. As can be seen, a network element bay (node) is typically built from modular components: shelves and plug-in circuit packs that make it easy to deploy the required capacity and then expand later as needed. The desired topology can be physically mapped into a specific arrangement of circuit packs (or cards) within the shelves of a network element bay. This modular architecture makes it easy to configure each network element for the specific requirements of each deployment site without over-provisioning, while allowing easy upgrades and expansions as new capacity is needed and new capabilities are developed. Therefore, upgrades from one type of network element to another can be easily accomplished without the need for replacing entire bays or shelves.

Network element installations, upgrades and reconfigurations can generally be accomplished by the addition or re-arrangement of individual circuit packs. Upgrades in this manner are common to optical amplifier products, for example, and target an increase in optical power which translates (in most cases) to an increase in the number of wavelengths that a given system can accommodate.

Figure 2A:
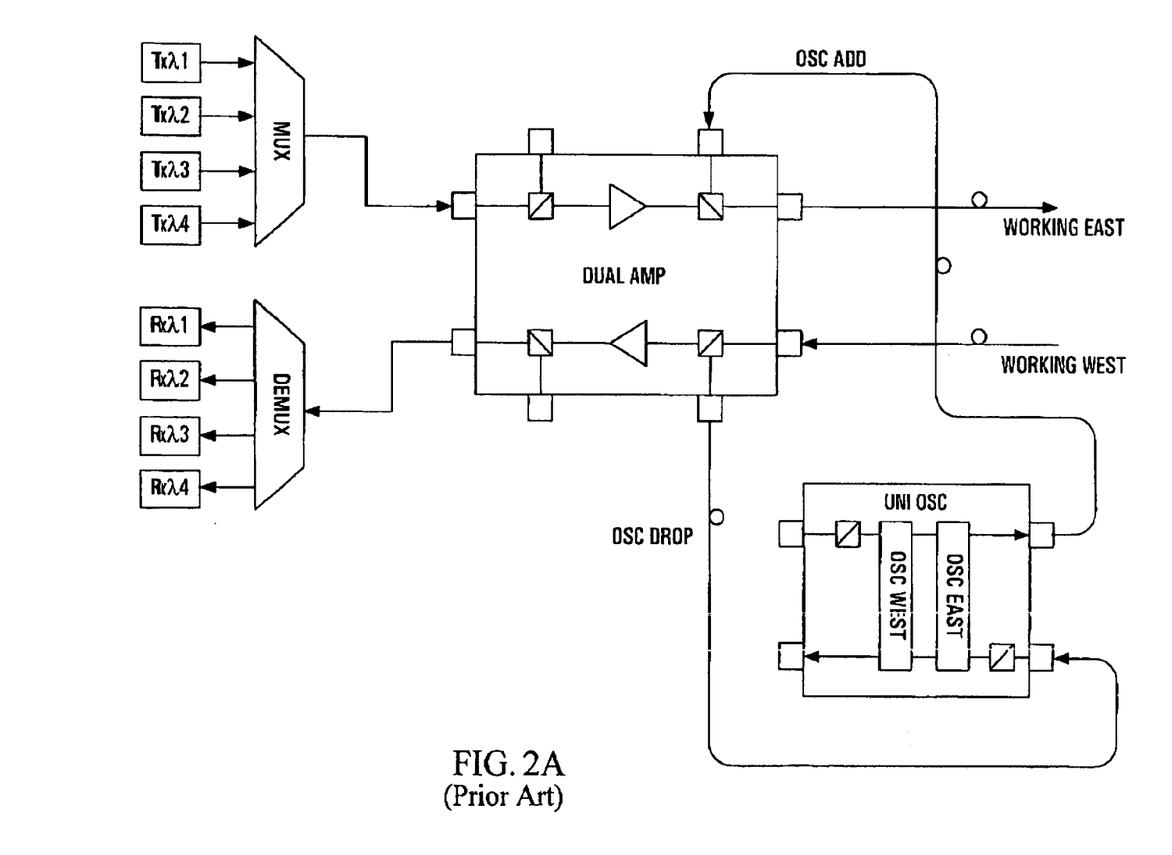
FIG. 2a depicts the dual amplifier configuration commonly employed at a line terminating equipment (LTE) site.

Specifically, in the case of optical amplifier products, the number of wavelengths that can be supported by a family of amplifier circuit packs generally depends on the DWDM network topology. For example, at line terminating equipment (LTE) sites where wavelengths are usually added to or dropped from the main traffic flow, a simple and low cost approach of optical amplification is to use a dual amplifier configuration as shown in FIG. 2a. Here, an amplifier group consists of a dual amplifier card connected to a dual optical service channel (OSC) card. The dual nature of these circuit cards (or packs) arises because of the inherent bi-directional flow of traffic (data) in transmission networks.

Figure 2B:
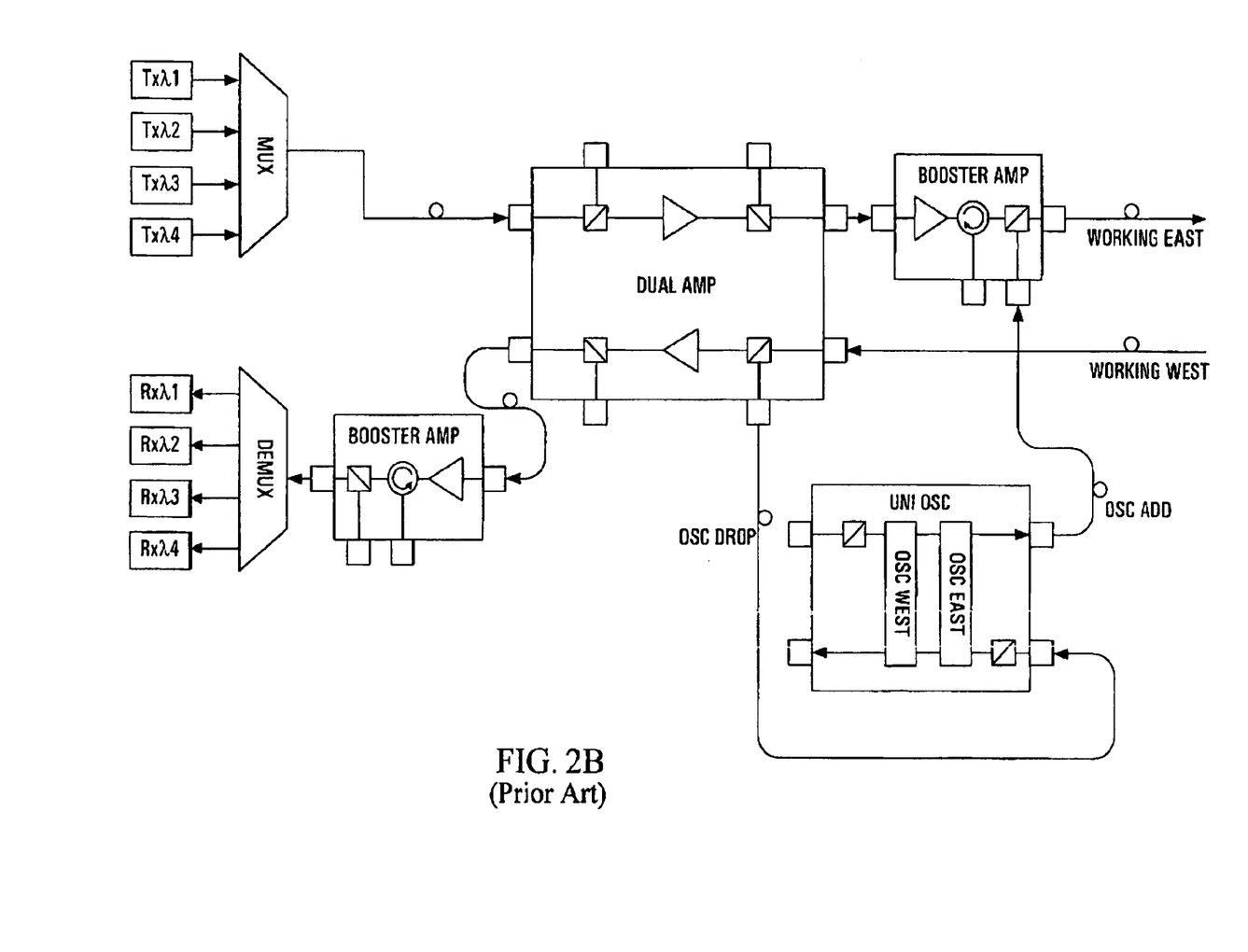
FIG. 2b is an upgraded version of the system in FIG. 2a using two additional booster amplifiers.

In FIG. 2b an upgraded configuration is shown wherein a booster amplifier has been added to each output of the dual amplifier to launch more optical power in order to effect an increase in the number of wavelengths the system can accommodate. In general, different power (i.e. different number of pump lasers) booster amplifiers may be used depending on the power requirements of the system. In order to facilitate such upgrades from a physical standpoint, space is typically left at the end of an amplifier group (e.g. Dual OSC circuit pack and Dual Amplifier circuit pack) in anticipation that the amplifier group will be upgraded with booster amplifiers.

Figure 3A:
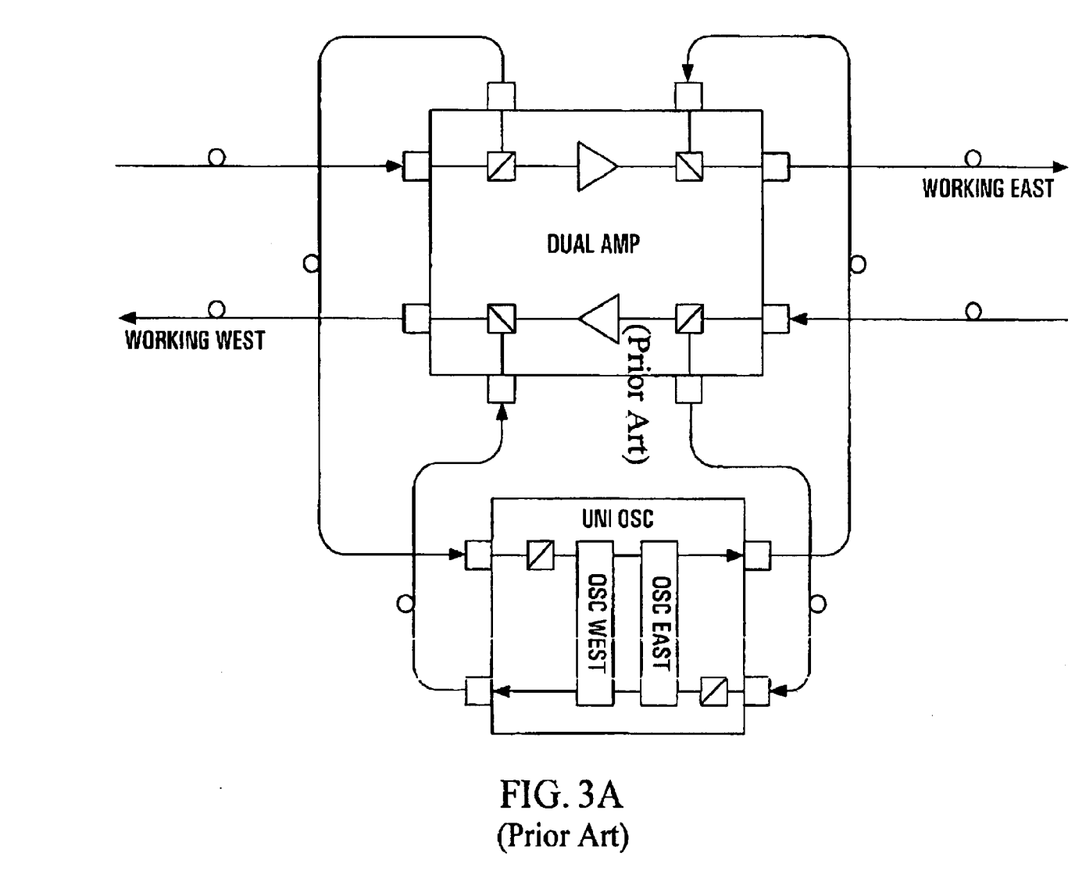
FIG. 3a illustrates the dual amplifier configuration commonly employed at a line amplifier site.
Figure 3B:
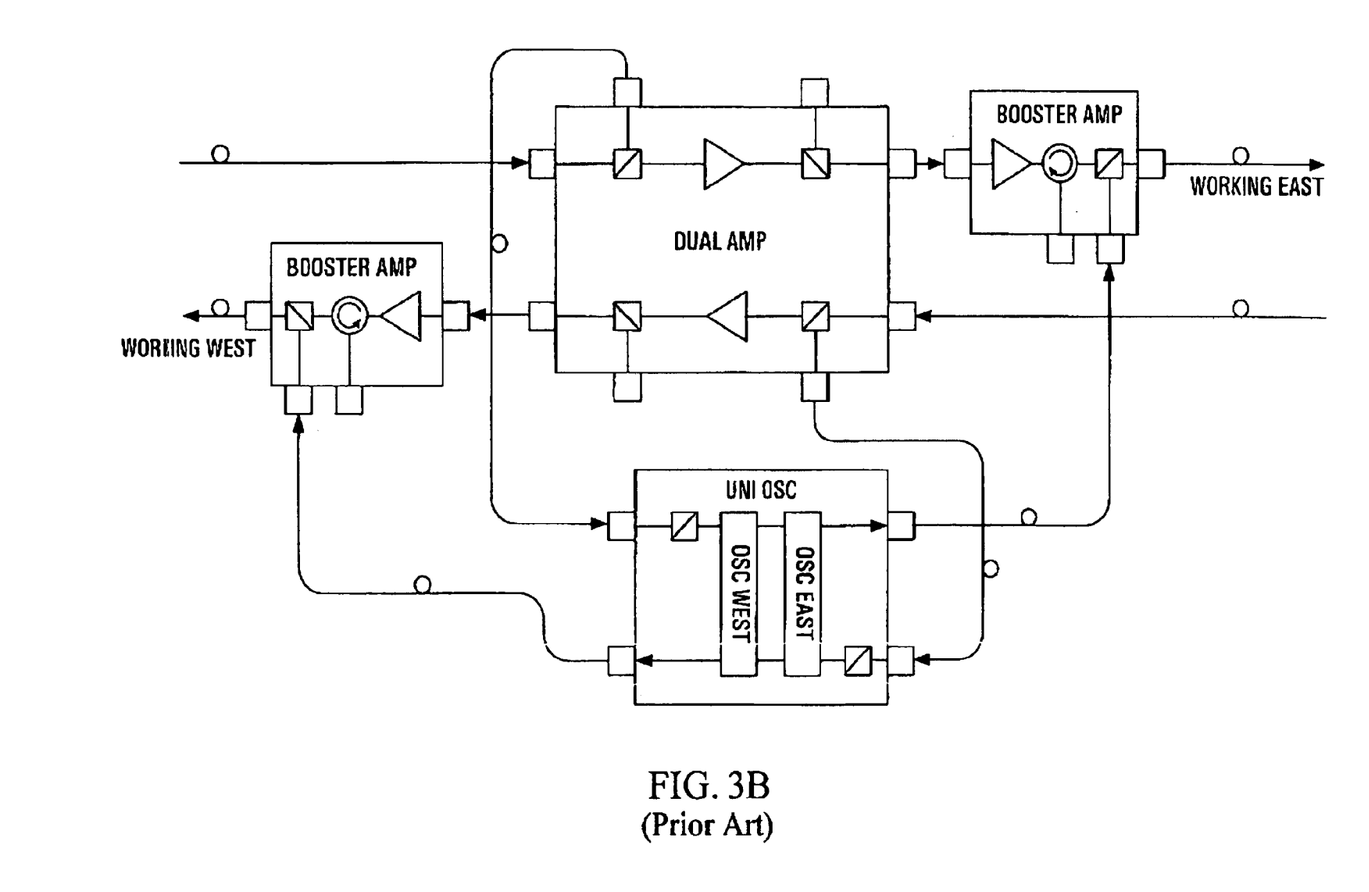
FIG. 3b is an upgraded version of the system in FIG. 3a using two additional booster amplifiers.

Similarly, a low cost implementation of a line amplifier (LA) site comprises the dual amplifier configuration of FIG. 3a. At LA sites, there is no electrical regeneration of the optical signal and no wavelengths are added or dropped. As seen in FIG. 3b, booster amplifiers may again be used to increase the launch power and, hence, number of wavelengths that can be accommodated. Different levels (i.e. number of pumps) of booster amplifiers can be added depending on the new number of wavelengths to be supported.

Figure 3C:
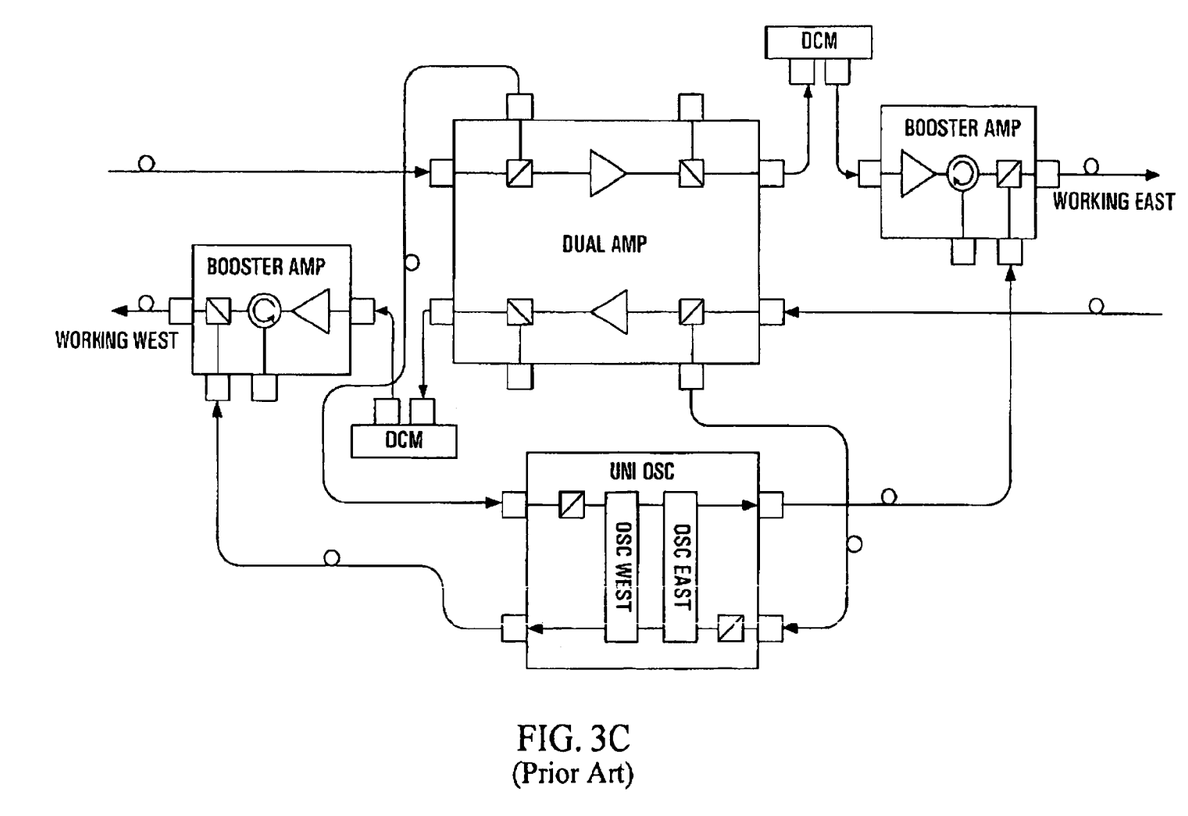
FIG. 3c depicts the inclusion of mid-stage access (MSA) capability into the upgraded system of FIG. 3b wherein the MSA component is a dispersion compensation module (DCM).

Furthermore, to accommodate familiar network housekeeping techniques such as dispersion compensation, wavelength equalization or add/drop multiplexing, line amplifier sites usually offer some form of mid-stage access (MSA) capability. An example of a line amplifier arrangement exploiting this MSA capability is shown in FIG. 3c, where dispersion compensation modules (DCMs) have been added to the system of FIG. 3b.

It is apparent that next generation products must operate in a modular manner to support different network element topologies which offer scalability with respect to the number of wavelengths deployed. As seen, upgrades or re-arrangements necessarily result in the fiber connections between respective circuit cards having to be changed. Traditionally, installers (craftspeople) have been dispatched to manually configure the association between different cards (circuit packs) connected through fiber at a given network element node. However, the optical interconnect density at network element nodes is continually increasing and is, as a result, becoming more and more complex. Accordingly, the fiber connections in such systems are prone to installation errors. As systems get more and more complex to support ever-increasing network capacity requirements, the consequences of incorrect connections will be more severe and network management support will have to be increased.

Therefore, providing some form of optical interconnection surveillance for all card-to-card optical connections within a group of related cards or within an optical network link is gaining importance as optical connections are becoming more complex. A method to identify connections and/or missing connections and to verify that these are, in fact, desired associations will be essential to reducing installation time and performing system upgrades. Methods for providing surveillance, alarming, fault location determination, and easing maintenance are critical to the effective implementation and functioning of future systems.

SUMMARY OF THE INVENTION

The present invention provides a method to automate fiber connectivity management in optical systems. The inventive method entails providing a dedicated low bit-rate communications channel unique to each fiber connection in an optical system. The purpose of this dedicated communications channel is to simplify fiber connection management by providing information to the system about a fiber connection between two respective cards, validating fiber connections in the system and ensuring that any specific connection between optical devices is the desired association. The dedicated communications channel of the invention supports optical interconnection surveillance for all card-to-card optical connections within a group of related cards or within an optical network link.

According to a first aspect of the invention, a port identification message generated at a first optical component is sent to a second optical component over a fiber connection using wavelength division multiplexing (WDM) techniques. Upon reception, the port identification message is sent to an agent along with information identifying the second optical component for processing. The agent checks this information against a predefined connection model to determine if the fiber connection is a desired association.

In another embodiment, an out-of-band arrangement may be employed wherein the port identification message generated at the first optical component is sent to the second optical component over a separate optical link parallel to the fiber connection. The port identification message and information identifying the second optical component are then processed to determine if the fiber connection is a desired association.

According to a third aspect of the invention, verification of a fiber connection may be achieved by applying a unique dither to an optical signal being transmitted over a fiber connection from a first optical component to a second optical component. The dither is detected at the second optical component and is sent to the agent for processing in order to determine the validity of the fiber connection.

Presently, interfaces between optically connected devices are configured manually and are, therefore, prone to installation errors. Providing fiber connectivity management according to the invention will enhance future products by simplifying the fiber connection validation process and ensuring that any specific connection between optical devices is, in fact, the required association. The invention is particularly useful in complex optical environments with many interconnected devices and where troubleshooting faulty connections is time-consuming and, therefore, very costly.

Other aspects and features of the present invention will become apparent to those ordinarily skilled in the art upon review of the following description of specific embodiments of the invention in conjunction with the accompanying drawings.

DESCRIPTION OF THE PREFERRED EMBODIMENTS

When an optical system is decomposed into multiple subsystems, the fiber connections between those subsystems are prone to installation error. An installer (or craftsperson) will generally have to manually configure the association between two respective components (or circuit packs) connected through fiber e.g. the connection between an OSC card and an amplifier card. As systems get more and more complex and the interconnect density continues to increase, trouble-shooting faulty connections becomes a daunting task for the craftsperson. The present invention seeks to simplify fiber connection management within optical networks.

Figure 4:
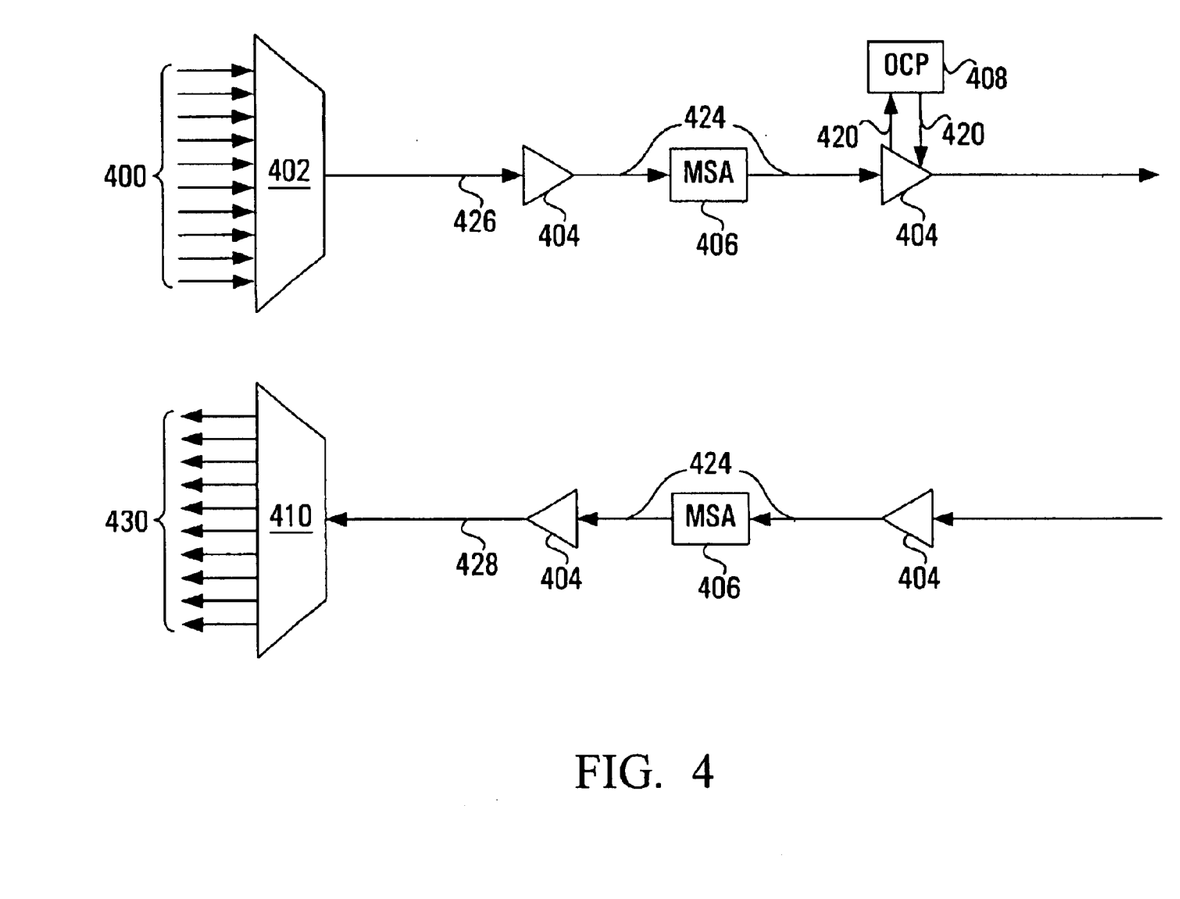
FIG. 4 is a high-level representation of the arrangement of optical amplifier products at a line terminating equipment (LTE) site.

The present invention is desirable between all interconnected devices in an optical system. For example, a portion of an optical system employing optical amplifier products is shown in FIG. 4. This is simply a high-level block representation of FIG. 2a, the typical arrangement at a line terminating equipment (LTE) site. Note that unidirectional traffic flow is assumed over a single fiber.

Considering the transmit (upper) path, a plurality of input optical wavelengths 400 are fed into a multiplexer 402. The output of the multiplexer is propagated through a series of amplifiers 404 to boost the multiplexed signal. Mid-stage access (MSA) capability 406 may also be included as shown to accommodate common network practices such as dispersion compensation, wavelength equalization, and optical add/drop multiplexing. Furthermore, an OSC card 408 is connected via connections 420 to an amplifier 404 and provides operations, administration, maintenance and provisioning (OAM&P) functionality to the optical network. Similarly, the return (lower) path, consists of a series of amplifiers 404 with midstage access capability 406, terminating at a demultiplexer 410 which generates a plurality of output optical wavelengths 430.

The present invention can be applied to all the optical fiber connections shown in FIG. 4. Specifically, the amplifier-to-OSC-card connections 420, the amplifier-to-multiplexer connection 426 or amplifier-to-demultiplexer connection 428 and the amplifier-to-midstage access (MSA) element connections 424 all require some type of mechanism for optical connectivity management. It should be noted that the amplifier-to-OSC-card connections 420 designate optical paths not carrying live traffic while the remainder of the connections define paths carrying live traffic.

The present invention pertains to a class of enhanced optical interconnection features which are intended to provide a dedicated low bit-rate communications channel associated with each fiber connection in an optical system. This is gaining importance as optical connections are becoming more and more complex. As will become apparent, the invention simplifies fiber connection management within optical networks.

Figure 5:
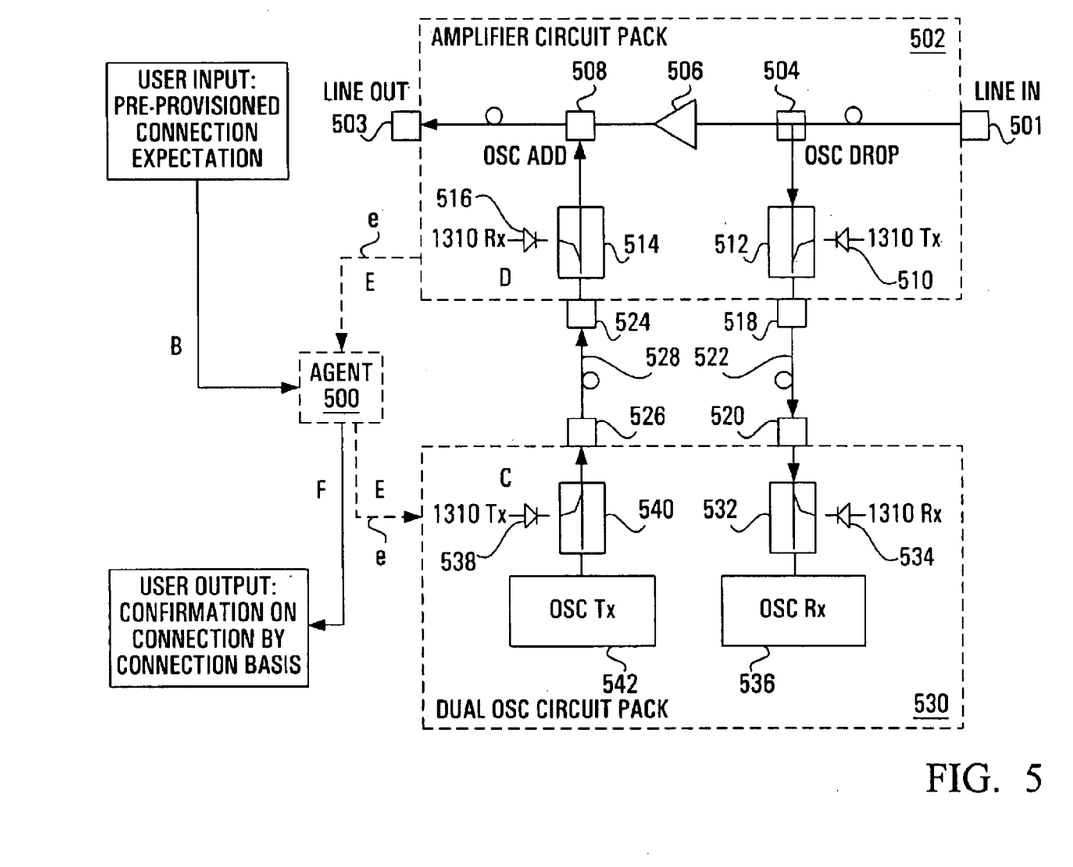
FIG. 5 depicts an in-band arrangement according to the invention which provides optical connectivity management between an amplifier circuit pack and a dual OSC circuit pack.

FIG. 5 depicts an "in-band" implementation of the invention to verify a fiber connection between an amplifier circuit pack 502 and a dual optical service channel (OSC) circuit pack 530. This arrangement corresponds to the amplifier-to-OSC card connections 420 of FIG. 4, for example. The amplifier circuit pack 502 comprises an optical amplifier 506, such as an erbium-doped fiber amplifier (EDFA). The amplifier 506 is preceded on its input side by an OSC drop filter 504 which is connected to an optical port 518 located on the exterior of the amplifier circuit pack 502. An OSC add filter 508 is located at the output end of the amplifier 506 and is connected to an optical port 524. On the exterior of the amplifier circuit pack (or card) 502 is further located an input (line-in) optical connector 501 and an output (line-out) optical connector 503.

The dual OSC circuit pack 530 contains an OSC transmitter (Tx) 542 and an OSC receiver (Rx) 536. The OSC receiver 536 is connected to an optical port 520. Similarly, the OSC transmitter 542 is connected to an optical port 526. A processing agent 500 is also connected to both the amplifier circuit pack 502 and dual OSC circuit pack 530 via electrical backplane connections denoted by the dashed lines labeled 'e'.

The OSC drop filter 504 in the amplifier circuit pack 502 extracts an OSC signal from incoming optical traffic and directs the OSC signal to optical port 518 for transmission to the OSC receiver 536 of the dual OSC circuit pack 530. On the other hand, the OSC add filter 508 combines an OSC signal received at optical port 524 of the amplifier circuit pack 502 with outgoing optical traffic to be transmitted through output port 503.

The amplifier circuit pack 502 is connected to the dual OSC circuit pack 530 via an optical fiber link 522 which connects port 518 to port 520 and an optical fiber link 528 which connects port 524 to port 526. Optical fiber link 522 completes the connection from the OSC drop filter 504 to the OSC receiver 536 while optical fiber link 528 completes the connection from the OSC transmitter 542 to the OSC add filter 508.

To facilitate optical connectivity management according to this first embodiment of the invention, the amplifier circuit pack 502 is further equipped with a 1310 nm transmitter (Tx) 510 and an associated WDM coupler 512 as well as with a WDM filter 514 and an associated receiver (Rx) 516. Likewise, the dual OSC circuit pack 530 has a 1310 nm transmitter (Tx) 538 with an associated WDM coupler 540 and a WDM filter 532 with an associated receiver (Rx) 534.

At the amplifier circuit pack 502, the WDM coupler 512 combines the output from its respective 1310 nm transmitter 510 with the OSC signal which is dropped at OSC drop filter 504 to optical port 518. At the dual OSC circuit pack 530, the WDM filter 532 extracts the 1310 nm portion of the combined signal transmitted from port 518 to port 520, and delivers it to the 1310 nm receiver 534 for detection. The same methodology applies to the 1310 nm transmitter 538 with associated WDM coupler 540 on the dual OSC circuit pack 530 and the WDM filter 514 with associated 1310 nm receiver 516 on the amplifier circuit pack 502.

The present invention seeks to identify the physical connections made between various optical components and to verify that these are, in fact, desired associations. For example, in relation to FIG. 5, the goal is to provide a method to determine if the fiber connections 522, 528 of port 518 to port 520 and port 524 to port 526, respectively, are valid based on some predetermined model of the network element.

The optical connectivity management process is initiated with user input of a pre-provisioned or inferred connection expectation to the processing agent 500 (process B). The pre-provisioned or inferred connection expectation is determined by the application specific requirement of the network element. In either case, sufficient information is provided to the agent to construct a predefined connection model that may be stored in non-volatile memory. For example, the pre-provisioned connection expectation may take the form of a table mapping a desired topology to required connections as a function of card type, card location, port identification (ID), card slot location and network element ID.

The processing agent 500 manages optical connectivity for the entire network element and is preferably implemented by some form of control software with the necessary processor complex (i.e. cpu, memory, non-volatile memory, communications ports and other necessary hardware). The agent 500 may be resident on one or more circuit packs and their associated processor complex, as the design may require. The agent 500 establishes the 'personality' of the network element based on user input of the pre-provisioned or inferred connection expectation. Furthermore, the agent 500 processes information received from the individual circuit packs (to determine the validity of each fiber connection) and indicates the results remotely and locally via a user-output interface on a connection-by-connection basis.

Taking the connection of port 526 to 524 as an example, a port identification (ID) message for port 526 is generated by the 1310 nm transmitter (Tx) 538 on the dual OSC circuit pack 530 (process C). The port ID message contains at least the following information: the type of card, card location, port identification, card slot location and network element (NE) identification. With the use of the WDM coupler 540, the port ID message is transmitted together with the standard OSC signal along the fiber connection 528 from port 526 on the dual OSC card 530 to port 524 on the amplifier card 502.

At the amplifier circuit pack 502, the port ID message is extracted from the OSC signal via the WDM filter 514 and 1310 nm receiver (Rx) 516 (process D). This information, along with information identifying port 524, must then provided to the processing agent 500 in order to completely specify the optical connection between the two ports under consideration. Specifically, a composite message is formulated at the amplifier circuit pack 502 that includes self-identity information (card, port, slot etc.) and the connection information (port ID message) received by it. This composite message is sent to the processing agent 500 via the backplane connection 'e' (process E). The optical connection specified by the composite message is checked against the connection model stored in the agent 500 (either locally or remotely), and the connection can be confirmed as correct. In cases where the hardware supports the appropriate communication path, an incorrect connection can be identified and alarmed via a user-output interface. In any event, a lack of confirmation that the connection is correct when it is made will indicate that a connection attempt is incorrect. In this manner, verification for each fiber connection is performed on a connection-by-connection basis. Additionally, once a valid:fiber connection is made, the information may be passed to a connection assist tool which builds a connection map of the network element.

The same methodology can be applied to verify the connection between port 518 and port 520. However, in this instance, to be consistent with the direction of transmission of the OSC signal, the 1310 nm transmitter (Tx) 510 is located on the amplifier circuit pack 502 and its associated 1310 nm receiver (Rx) 534 on the dual OSC circuit pack 530.

The user-output interface allude to above may comprise any suitable indication means visible to a user (or craftsperson) for confirming a correct connection or alarming of a misconnection. For example, small and inexpensive LEDs may be located at each port of a given circuit pack. Using appropriate electronics, the LEDs can be made to light up in different ways in order to provide one or more types of user feedback. For example, an LED can be made to remain in a blinking state as long as a connection to its respective port is invalid or missing; once a valid port connection is made, the LED can be made to turn off signifying a valid fiber connection. As anyone skilled in the art will appreciate, this is just one of many possible indication scheme, and has been included merely for illustrative purposes. Many other possibilities or variations may exist.

Figure 6:
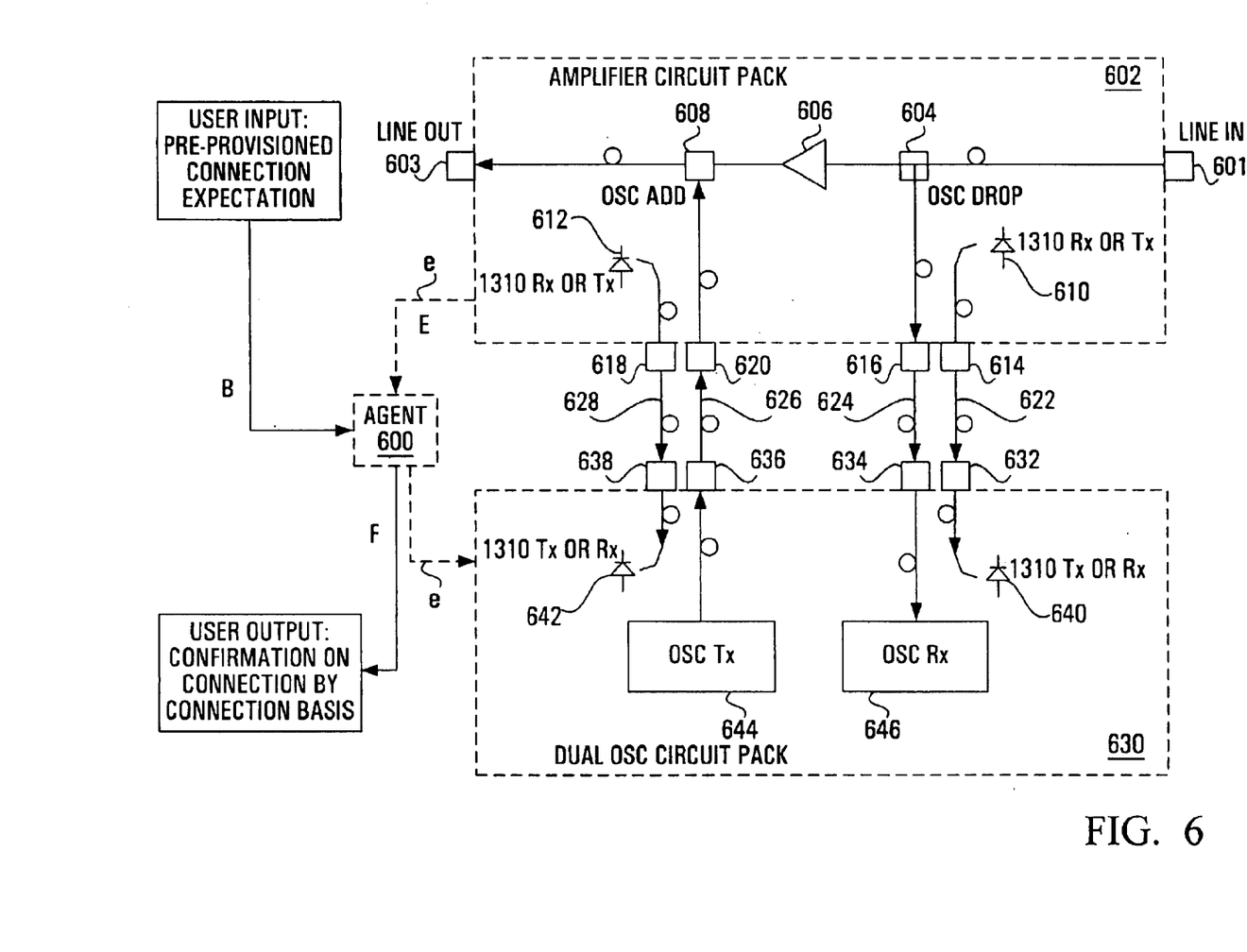
FIG. 6 depicts an out-of-band arrangement according to the invention which provides optical connectivity management between an amplifier circuit pack and a dual OSC circuit pack.

FIG. 6 depicts an "out-of-band" implementation of the present invention for verifying the fiber connections between an amplifier circuit pack 602 and a dual OSC circuit pack 630 as in the previous example. Therefore, the basic configuration closely resembles that of FIG. 5. The dual OSC circuit pack 630 comprises an OSC transmitter (Tx) 644 and an OSC receiver (Rx) 646. The amplifier circuit pack 602 comprises an OSC drop filter 604 preceding an optical amplifier 606 and an OSC add filter 608 located after the amplifier 606.

To complete the connection of the OSC transmitter 644 to the OSC add filter 608, a fiber connection 626 connects a port 636 on the dual OSC circuit pack to a port 620 on the amplifier circuit pack 602. Similarly, a fiber connection 624 connects a port 616 on the amplifier circuit pack 602 to a port 634 on the dual OSC circuit pack 630 to complete the connection of the OSC drop filter 604 to the OSC receiver 646. The goal in this implementation is to again verify that proper port-to-port connections are established i.e. port 616 on the amplifier circuit pack 602 is connected to port 634 on the dual OSC circuit pack 630 and port 636 on the dual OSC circuit pack 630 is connected to port 620 on the amplifier circuit pack 602. In this implementation, however, transmission of a port ID message from one circuit pack to another will be supported over a separate physical link parallel to each fiber connection in the system.

Taking the fiber connection 626 as an example, a 1310 nm transmitter (Tx) or receiver (Rx) 642 is provided at the dual OSC circuit pack 630 and is connected to an optical port 638. An associated 1310 nm receiver (Rx) or transmitter (Tx) 612 is provided at the amplifier circuit pack 602 and is connected to an optical port 618. Transmission of the port ID message from one circuit pack to the other is supported over a separate optical link 628 running parallel to the fiber connection 626. The optical link 628 connects the optical port 618 to port 638. Using a keyed dual fiber interconnect system (i.e. with two optical fibers packaged in one jacket), the parallel fiber link 628 can be made invisible to the user. Two examples of systems having keyed optical connector types suitable for establishing the paired fiber connections according to this specific implementation are the MT-RJ and SCDC interconnect systems. These two interconnect systems are but two examples of how the paired fiber connection may be realized in this implementation, and those skilled in the art will appreciate that various other methods are possible. Finally, a similar arrangement exists for the fiber connection 624 with a separate optical link 622 running parallel to it connecting a port 614 on the amplifier circuit pack 602 to a port 632 on the dual OSC circuit pack 630.

In this embodiment, connectivity management is again initiated by a user input of a pre-provisioned connection expectation to a processing agent 600 (process B). In this case, however, a port ID message identifying a port 636 or 620 of the fiber connection 626 is sent via the 1310 nm transmitter (Tx) 642 or 612 along the separate optical link 628 and is received at the associated 1310 nm receiver (Rx) 612 or 642. This information along with self-identity information (port, card, slot etc.) of the port 620 or 636 corresponding to the receiver (Rx) 612 or 642 is then sent to the agent 600 via a backplane connection 'e' (process E). The agent 600 processes the information and notifies the user of the result i.e. the information is checked against the connection model and the connection is either confirmed or alarmed as incorrect (process F). Suitable indication means, such as the one described for the implementation of FIG. 5, may again be employed to indicate the status of a particular connection to a user. Furthermore, once a valid port connection is made, the information may then be passed to a connection assist tool which builds a connection map of the network element.

Note that in this embodiment, because connectivity management for each fiber connection is implemented over a separate optical link, the direction of transmission of the port ID message is immaterial i.e. information for a given port can be generated and transmitted from either circuit pack to the other. All that is simply required is that a 1310 nm transmitter (Tx) be provided at one end of an optical link and that an associated receiver (Rx) be provided at the other end. For example, with regards to the optical link 628 in FIG. 6, the dual OSC circuit pack 630 may contain the transmitter (Tx) 642 with an associated receiver (Rx) 612 located on the amplifier circuit pack 602. The converse also may also hold. The same applies to the optical link 622 between port 632 and port 614.

Those skilled in the art will appreciate that the separate physical link associated with each fiber connection in a system according to this embodiment of the invention need not necessarily be of an optical nature. For example, a combined optical/electrical implementation may be employed wherein a separate electrical link (e.g. twisted pair copper) is uniquely associated with each fiber connection. In this case, the 1310 nm transmitters and receivers would be replaced by their electrical counterparts.

Figure 7:
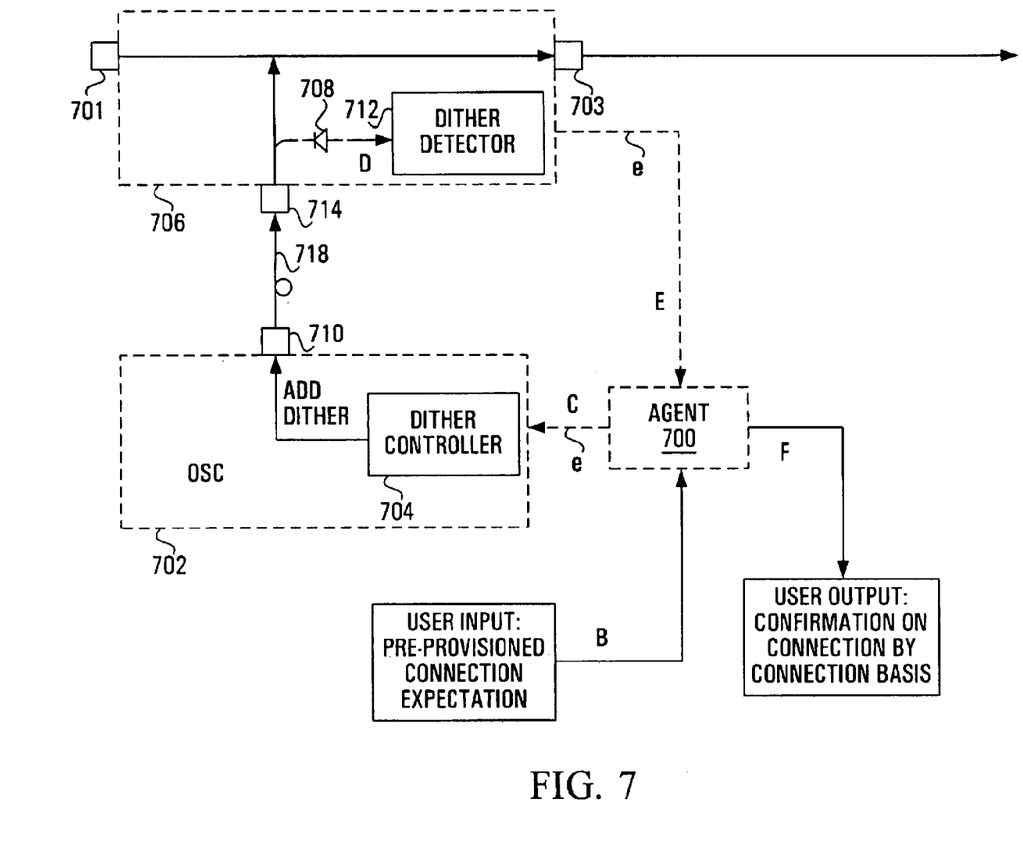
FIG. 7 depicts an alternate in-band embodiment of the invention using dithering to provide optical connectivity management between an OSC circuit pack and an amplifier circuit pack.

FIG. 7 depicts an alternate "in-band" implementation of the invention applied to a connection between the Tx module of an OSC card 702 and the corresponding receiving portion of an amplifier card 706. The OSC card 702 now includes a dither controller 704 which is connected to an optical transmit (Tx) port 710 located on the exterior of the OSC card 702. The OSC transmit (Tx) port 710 provides connectivity to other optical components. The amplifier card 706 includes a tap coupler 707 feeding a photodiode 708 which, in turn, is connected to a dither detector 712. The amplifier card 706 also includes an input (line-in) port 701, an output (line-out) port 703 and an optical port 714. The optical port 714 provides connectivity to other optical components. Therefore, the OSC card 702 is connected to the amplifier card 706 via a fiber connection 718 which connects the transmit (Tx) port 710 on the OSC card 702 to the optical port 714 on the amplifier card 706. Finally, a processing agent 700 is provided as in the previous implementations and, as before, is connected to both cards 702, 706 via electrical backplane connections denoted by the dashed lines labeled 'e'.

As in the previous implementations, the goal here is to verify that the fiber connection 718 between the OSC transmit (Tx) port 710 and the optical port 714 on the amplifier card 706 is a desired association. However, in this alternate "in-band" realization, optical connectivity management is implemented by modifying the active underlying transmission between optical components (or cards) without impacting the performance as described below.

Referring to FIG. 7, optical connectivity management is initiated with user input of a pre-provisioned or inferred connection expectation to the processing agent 700 (process B). In response, the processing agent 700 sends a message via its electrical backplane connection 'e' (process C) to the OSC card 702 directing the dither controller 704 to add a small dither signal to the optical signal (e.g. OSC signal) generated at the OSC transmitter (not shown). Dithering implies low-level (1–10%) modulation of an optical signal. The technique of dithering an optical signal is well known in the art and, as such, will not be described in any detail. In any case, a unique dither code (or specific modulation format) is applied to the optical signal generated at the OSC transmitter. This may be accomplished, for example, with the use of a low loss, low attenuation, polarization-independent attenuation device.

The dithered optical signal exits the OSC card 702 at the transmit (Tx) port 710 and is transmitted to optical port 714 of the amplifier card 706 over the fiber connection 718. for tapping off a portion of the received OSC signal and a photodiode 708 connected to a dither detector 712. At the amplifier card 706, a portion of the dithered optical signal is tapped off to the photodiode 708 which feeds into the dither detector 712 (process D). After detection, the dither information is sent to the processing agent 700 via an electrical backplane connection 'e' (process E). As in the previous embodiments, the agent 700 processes the information and, using suitable indication means, notifies the user of the result.

The dithering technique performs optical interconnection surveillance by verifying whether a connection is valid or invalid on a connection-by-connection basis. Specifically, the processing agent 700 sends a message to the dither controller 704 of the OSC card 702 to add a small dither to the optical signal generated at the OSC transmitter. At the amplifier card 706, information extracted by the dither detector 712 is sent back to the agent 700 for processing. If the information from the dither detector 712 matches with the dither pattern (or code) for that particular connection in the stored connection model, then the fiber connection is confirmed as valid.

The processing agent 700 is linked to both a user-input interface (for receiving the pre-provisioned or inferred connection expectation) and a user-output interface (for verifying connections to a user). If a connection is determined to be valid (i.e. it is a desired association), the processing agent 700 effects suitable indication means on the user-output interface to inform the user that a correct connection has been made. However, if a particular connection is invalid or missing, then the processing agent effects the user-output interface to indicate that the intended connection has not yet been completed.

In the implementation shown in FIG. 7, the dithered optical signal is left alone and there is no attempt to cancel or remove the dither from the optical signal received at downstream equipment e.g. the amplifier card 706. In such circumstances, the dither may be handled via standard techniques such as equipment correlation or orthogonal signaling. For example, each piece of downstream equipment may detect the dither and a system agent may then correlate the presence of the signal at each downstream device with the path followed by that carrier. In the case of orthogonal signaling, the dither codes can be made sufficiently different to allow unique and unambiguous detection through electrical filtering or digital signal processing with little or no cross talk from other signals. The detection process may either employ time-domain pattern matching (correlation) techniques or frequency-domain techniques such as filtering. Alternatively, the dither may be cancelled from the optical signal received at downstream equipment using destructive interference with the aid of a low loss, low-attenuation device as described in the embodiments that follow.

Figure 8:
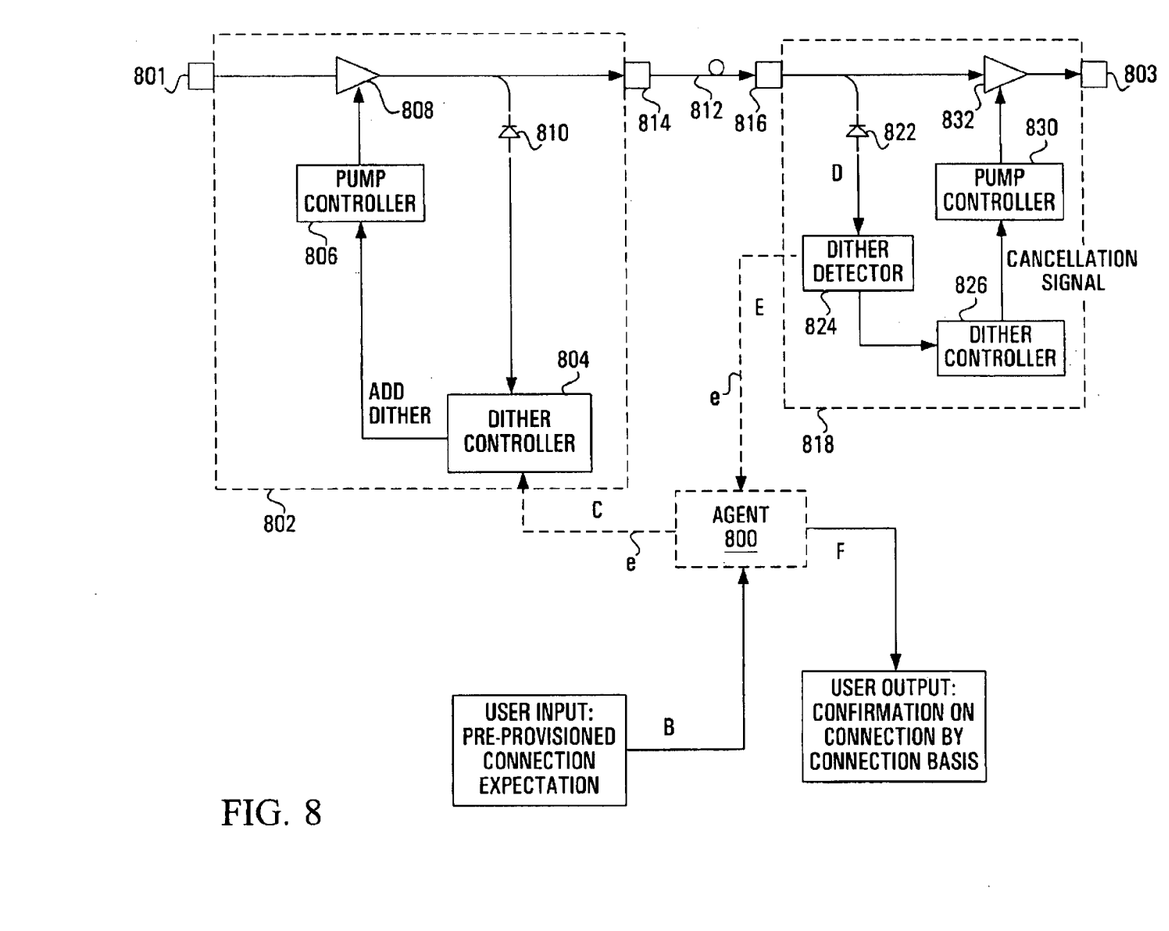
FIG. 8 depicts an extension of the in-band dithering technique shown in FIG. 7 to provide optical connectivity management between two amplifier products.

FIG. 8 depicts an additional "in-band" implementation of the invention employing the dithering technique to provide connectivity management between two amplifier products. Again, the idea here is to modify the active underlying transmission without significantly impacting performance.

A first amplification module 802 is comprised of a dither controller 804 whose output feeds a pump controller 806 of a respective optical amplifier 808. The output of the amplifier 808 is tapped off to a photodiode 810 which provides feedback to the dither controller 804. A second amplification module 818 is comprised of a photodiode 822 which feeds a dither detector 824. The dither detector 824 is further connected to a dither controller 826 whose output feeds a pump controller 830 of an optical amplifier 832. An output port 814 of amplification module 802 is connected to an input port 816 of amplification module 818 via a fiber connection 812. As in all previous examples, both optical components of interest are connected via electrical backplane connections 'e' to a processing agent 800.

The implementation presented in FIG. 8 begins with user input of a pre-provisioned or inferred connection expectation to the agent 800 (process B). The agent 800 sends a message via its backplane connection 'e' to the dither controller 804 of amplification module 802 to dither the pump controller (laser) 806. This generates a dithered optical signal at the output of the source amplifier 808 (i.e. the underlying traffic is dithered). The photodiode 822 of the receiving amplification module 818 passes the received dithered. optical signal to the dither detector 824 (process D) which then extracts the applied dither and sends this information to the agent 800 via the electrical backplane connection 'e' (process E). The agent 800 processes the information and notifies the user of the result.

The amplification module 818 further comprises the dither controller 826 which provides a cancellation signal to the pump controller 830 of the optical amplifier 832. The dither is then cancelled from the received optical signal using destructive interference.

Figure 9:
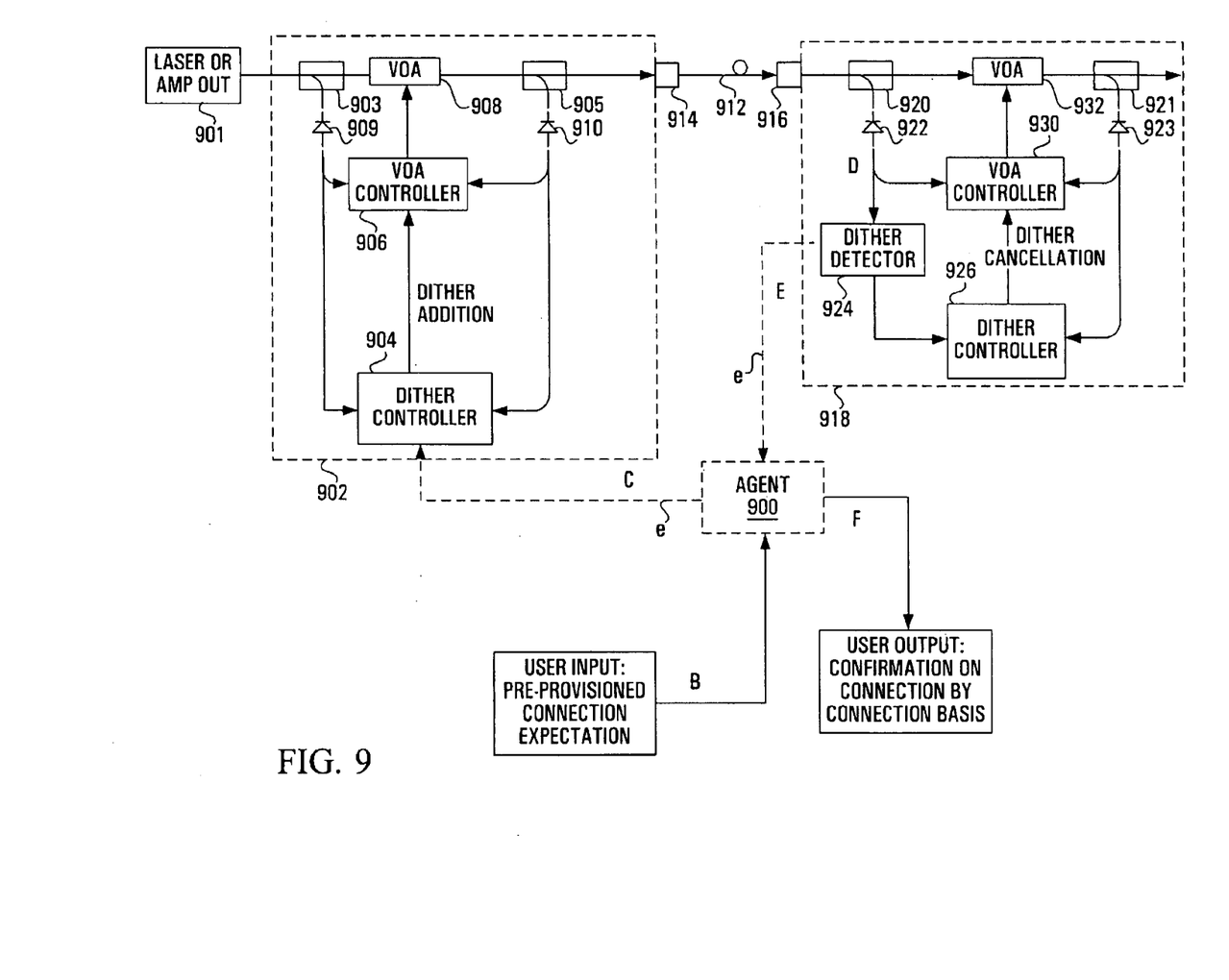
FIG. 9 illustrates a general in-band embodiment of the invention implemented between two circuit packs and using variable optical attenuators (VOAs) as the dithering mechanism.

Finally, a generic example of using the dithering technique to provide connectivity management between arbitrary optical components is illustrated in FIG. 9. In this embodiment, an existing laser signal or amplifier output 901 is dithered using a variable optical attenuator (VOA) 908 in a first circuit pack 902 and then detected and removed by a VOA 932 in a downstream circuit pack 918. VOAs are standard devices known in the art used for attenuating the intensity of an optical signal in response to a control signal.

The first circuit pack 902 includes a dither controller 904 connected to a VOA controller 906 which, in turn, supplies a control signal to the VOA 908. As is standard, the attenuation of the VOA 908 is controlled using embedded tap couplers 903, 905 and PIN diode detectors 909, 910 located both before and after the VOA 908. Similarly, the downstream circuit pack 918 includes a dither detector 924 which is connected to a dither controller 926. The dither controller 926 provides a dither cancellation signal to a VOA controller 930 which supplies a control signal to the VOA 932. The attenuation of the VOA 932 is controlled using embedded tap couplers 920, 921 and PIN diode detectors 922, 923 located both before and after the VOA 932. The circuit packs 902, 918 are connected via an optical fiber 912 which connects a port 914 on the first circuit pack 902 to a port 916 on the downstream circuit pack 918.

Connectivity management for this embodiment is initiated in the same manner as before with user input of a pre-provisioned or inferred connection expectation to an agent 900. The agent 900 then sends a message via a backplane connection 'e' to the dither controller 904 of the first circuit pack 902. In this case, however, the dither is added by modulating an attenuation control signal from the VOA controller 906 with a small signal from the dither controller 904. The amplitude of this dither may be maintained as a fixed percentage of the average output power, as measured at the output tap 905.

At the downstream circuit pack 918, the tap coupler 920 provides a portion of the optical signal received from the first circuit pack 902 to the PIN diode 922 for detection. The dither which was applied at the first circuit pack 902 is then extracted by the dither detector 924 and sent to the agent via an electrical backplane connection 'e'. The agent 900 processes the information and notifies the user of the result (i.e. connection verification).

Using the inverse of the signal extracted by the dither detector 924, a dither cancellation signal may be generated by the dither controller 926 and applied to the VOA controller 930 to effect the removal of the dither at the VOA 930 using destructive interference. Furthermore, dither cancellation may be confirmed by the dither controller 926 operating at the output tap of the VOA 932. Note that the dither amplitude for the cancellation signal can be controlled as a fixed percentage of the average input power, and its effectiveness confirmed via the output tap.

Regardless of the chosen method of implementation, the present invention is highly desirable between all interconnected devices in an optical system. The primary purpose of the dedicated communications channel is to identify the connection made and verify that this is, in fact, a desired association. The invention is capable of identifying connections that either conform to or deviate from a pre-defined connection model. The invention is also capable of identifying any connection and/or missing connection which differs from user input of a pre-provisioned expectation (interconnect rules for a given software release).

In an ideal implementation, the invention will provide a bi-directional channel directly associated with each optical fiber connection made in a system. In this way, the optical association between optically interconnected devices may be easily established. If a unidirectional implementation is chosen, the optical component that receives the interconnect message (port ID message) is required to open a software data channel to the 'sending' component to establish full association between the two components under consideration. Whatever the case may be, the invention provides sufficient information to a processing agent in order that it may fully resolve a fiber connection. The agent must communicate with both the smart connect message sender and receiver to confirm the desired connection has been established.

Optical connectivity management provided for in the manner of the present invention offers numerous advantages. The invention provides a platform to construct a complete network model (based on verifiable connections), which has many applications in surveillance, alarming, fault location, reducing installation time, easing maintenance, and in-field system upgrades.

For example, the invention facilitates the efficient installation or upgrade of an optical network. However, as optical connections are becoming more and more complex, the fiber connections between components are prone to installation and upgrade errors as installers usually have to manually configure the association between two circuit cards. The present invention provides a mechanism to validate optical connections from end-to-end and to verify that these, in fact, are the desired associations.

Furthermore, the invention provides a simple mechanism to locate faults within an optical network. This affords a simple procedure for the craftsperson where troubleshooting faulty connections would otherwise be very time-consuming and therefore costly. Therefore, the connection model that has been established can be a very effective system-lineup-and-test (SLAT) and maintenance tool.

While preferred embodiments of the invention have been described and illustrated, it will be apparent to one skilled in the art that numerous modifications, variations and adaptations may be made without departing from the scope of the invention as defined in the claims appended hereto.

What is claimed is:

1. In an optical system comprising a plurality of interconnected optical components, a method of verifying if a fiber connection between a first optical component and a second optical component is correct, the method comprising:

storing a predefined connection model in a processing agent;

generating a port identification message at the first optical component;

transmitting the port identification message from the first optical component to the second optical component over a dedicated communications channel running parallel to the fiber connection;

conveying the port identification message received at the second optical component and information identifying the second optical component to the processing agent;

checking the port identification message and information identifying the second optical component against the predefined connection model stored in the processing agent to determine if the connection is correct; and indicating a correct connection or a misconnection.

2. A method as claimed in claim 1 wherein the dedicated communications channel running parallel to the fiber connection is an optical fiber link separate from the fiber connection.

3. A method as claimed in claim 1 wherein the dedicated communications channel running parallel to the fiber connection is a distinct wavelength channel inside the fiber connection.

4. A method as claimed in claim 1 wherein the port identification message transmitted from the first optical component to the second optical component comprises information about the first optical component including but not limited to the type of component;

the component location;

port identification;

component slot location; and network element identification (ID).

5. A method as claimed in claim 1 wherein the dedicated communications channel running parallel to the fiber connection is bi-directional.

6. A method according to claim 1 wherein the processing agent is resident on the first or second optical component.

7. A method according to-claim 1 wherein the predefined connection model stored in the processing agent is generated from user input of a pre-provisioned or inferred connection expectation.

8. An optical connectivity management system for determining if a fiber connection between a first optical component and a second optical component in an optical system is correct, the system comprising:

a processing agent for storing a pre-defined connection model of the optical system;

a dedicated communications channel between the first optical component and second optical component running parallel to the fiber connection;

an optical transmitter located at the first optical component for transmitting a port identification message over the dedicated communications channel to the second optical component;

an optical receiver located at the second optical component for receiving the port identification message transmitted from the first optical component;

means for transmitting the port identification message received at the second optical component and information identifying the second optical component to the processing agent for processing; and means for indicating a correct connection or a misconnection.

9. An optical connectivity management system according to claim 8 wherein the dedicated communications channel between the first optical component and second optical component is an optical fiber link separate from the fiber connection.

10. An optical connectivity management system according to claim 8 wherein the dedicated communications channel between the first optical component and second optical component is a distinct wavelength channel inside the fiber connection.

11. An optical connectivity management system according to claim 10 wherein the transmitter at the first optical component comprises an optical source with a WDM coupler and the receiver at the second optical component comprises a WDM filter with a photodetector.

12. An optical connectivity management system according to claim 9 wherein the dedicated communications channel between the first optical component and the second optical component is bi-directional.

13. A processing agent for use in an optical system to determine if a fiber connection between a first optical component and a second optical component is correct, the processing agent comprising:

means for storing a predefined connection model of the optical system;

means for receiving a port identification message identifying the first optical component and information identifying the second optical component from the second optical component;

means for checking the port identification message and information identifying the second optical component against the predefined connection model; and means for indicating a correct connection or a misconnection.

14. In an optical system comprising a plurality of interconnected optical components, a method of verifying if a fiber connection between a first optical component and a second optical component is correct, the method comprising:

storing a predefined connection model in a processing agent;

adding a dither to an optical signal to be transmitted from the first optical component to the second optical component to generate a dithered optical signal;

transmitting the dithered optical signal from the first optical component to the second optical component over the fiber connection;

receiving the dithered optical signal at the second optical component;

detecting the dither contained in the dithered optical signal received at the second optical component;

conveying the dither detected at the second optical component and information identifying the second optical component to the processing agent;

checking the dither and information identifying the second optical component against the predefined connection model stored in the processing agent to determine if the connection is correct; and indicating a correct connection or a misconnection.

15. A method according to claim 14 wherein the dither is cancelled from the dithered optical signal at the second optical component using destructive interference.

16. A method according to claim 15 wherein the destructive interference is carried out using a low-loss, low-attenuation device.

17. A method according to claim 15 wherein the destructive interference is carried out using an optical amplifier.

18. A method according to claim 14 wherein the processing agent is control software located remotely from the first and second optical components.

19. A method according to claim 18 wherein the processing agent is connected to the first and second optical components via electrical backplane connections.

* * * * *